United States Patent [19]

Lin

[11] Patent Number: 5,786,590
[45] Date of Patent: Jul. 28, 1998

[54] METHOD FOR DRIVING A SCANNING SYSTEM WITH A REFERENCE PATTERN

[75] Inventor: John Lin, Hsinchu, Taiwan

[73] Assignee: Mustek Systems Inc., Taiwan

[21] Appl. No.: 832,338

[22] Filed: Apr. 3, 1997

[51] Int. Cl.⁶ ........................................... H01J 40/14
[52] U.S. Cl. ........................... 250/208.1; 250/559.4; 358/498
[58] Field of Search ................... 250/208.1, 559.4, 250/559.44; 358/488, 498, 475, 486; 355/83, 84

[56] References Cited

U.S. PATENT DOCUMENTS 4,958,069  9/1990  Okamori ........................ 250/559.4

*Primary Examiner*—Que Le
*Attorney, Agent, or Firm*—Sughrue, Mion, Zinn, Macpeak & Seas, PLLC

[57] ABSTRACT

A document holder is fed into a cassette scanning system. A sensor that is set in the cassette scanning system detects whether the document holder is in the scanning system or not. The scanning system is responsive to the sensor to drive the image sensor to a predetermined position where is exactly over a reference pattern. The reference is formed in the document holder. Next, the image sensor starts to detect whether the document is in the document holder or not. The scanning system is responsive to the signal to drive the image sensor for capturing the image of the document.

8 Claims, 3 Drawing Sheets

/ 1

METHOD FOR DRIVING A SCANNING SYSTEM WITH A REFERENCE PATTERN

CROSS REFERENCE TO RELATED APPLICATION

This following copending U.S. patent application assigned to the assignee of the present invention is related to the present invention. Ser. No. 08/790,885 filed Feb. 3, 1997 and entitle "CASSETTE SCANNING SYSTEM".

FIELD OF THE INVENTION

The present invention relates to a scanning system, and more specifically, to a driving method for a scanning system.

BACKGROUND OF THE INVENTION

Conventional scanning system can be approximately divided into two segments that are handy a scanning system and flat-bed a scanning system. A scanning system makes use of focusing a reflecting light beam through a photodetector to generate an image signal for further image processing. A conventional scanning system apparatus includes a light source, a mirror, and a lens set, which are used to guide the reflecting light to a charge couple device (CCD). The charge couple device is utilized to generate an image signal. In such a scanning system, light is emitted from the light source and is then reflected from a document. The reflected light therefrom is further reflected by a mirror in predetermined direction and penetrates a projection lens set. An image is capture by a solid state imaging device. The device effects a photoelectric conversion into electrical signal.

Typically, image capture is achieved by passing the document in front of a device known as a CCD. This consists of a large of very small, individual semiconductor receptors, disposed in a linear array. The document is passed in front of the CCD and a complete image of the document linear segments individually captured from the CCD. A preprocessing element is then used to respond the image electrical signal and adjust dc gain of the image signal. An analogue to digital converter is used to convert adjusted image signal to a digital signal and a post-processing element to generate an image code.

The shading correction comprises two steps. In the first step, the one-bit pixel data items defining an image are corrected based on the difference between the black reference signal and the white reference signal, thereby forming corrected image data. In the second step, the low frequency distortion and high frequency distortion occurring in the data-reading unit are minimized in accordance with the corrected image data.

In practicing the scanning system, the light source is reflected from the surface of a document, then it is reflected against from the mirror and focused by a lens set. The mirror and the lens set are used to guide the light beam to a CCD. Subsequently, the light beam is converted to an image signal by the CCD, and direct current (d.c.) gain of the image signal is adjusted by a pre-processing element, i.e. a d.c. gain voltage amplifier. Then the adjusted image is fed to an analogue to digital converter (ADC) for converting adjusted image signal to a digital signal. The digital signal is fed to a post-processing element to generate an image code by processing the digital signal through highlight, shadow, and Gamma correction.

However, what is required is a scanning system that can be built in a computer system for the present demanded. For this reason, a method is need to drive the scanning system.

SUMMARY OF THE INVENTION

It is an object of the present invention to provide a method for driving a cassette scanning apparatus.

A document holder is fed into a cassette scanning system. Then, a sensor that is set in the cassette scanning system detects the document holder is in the scanning system or not. If the sensor detects the document holder is in the scanning system. The scanning system is responsive to the sensor to drive the image sensor to a position where is exactly over the reference pattern that is formed in the document holder. Next, the image sensor starts to detect whether the document is in the document holder or not. If the image sensor can detect to the signal that is reflected from the reference pattern. It means that the document is not inside the document holder. If the document is in the document holder, the reference pattern is covered by the document. Thus, the image sensor can not detect the reflected signal from the reference pattern. Therefore, the scanning system is responsive to the signal to drive the image sensor for capturing the image of the document.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The present invention discloses a driving method for a cassette scanning system that can be built in a computer system. The scanning system has a document holder for holding a document. In addition, the document holder can be separated from the scanning system.

Figure 1:
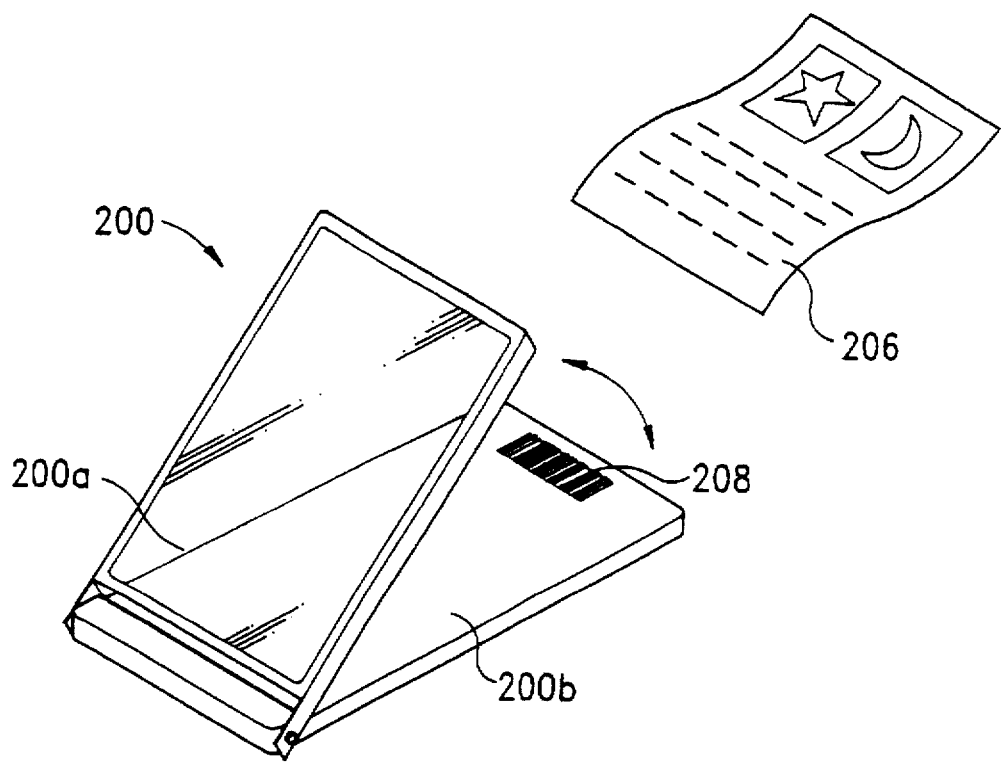
FIG. 1 is a schematic drawing of a document holder with a reference pattern according to the present invention.

As shown in FIG. 1, the document holder 200 consists of a first cover 200a and a second cover 200b. One end of the first cover 200a is connected to one end of the second cover 200b. The document holder 200 can be pivotal opened in order to put a document 206 into the document holder 200. Further, at least a portion of one of the covers 200a, 200b has a plate that is made of transparent material such as glass, acrylic resin. This arrangement is used for the image of the document 206 that can be captured by an image sensor. A reference pattern 208 is set on one of the covers 200a, 200b. The reference pattern 208 is used for the cassette scanning system to detect whether the document 206 is in the document holder 200 or not. For example, the reference pattern 208 is preferably set on the second cover 200b while the first cover 200a is made of transparent material. Alternatively, it also can achieve the purpose by using the converse arrangement for the present invention.

Figure 2:
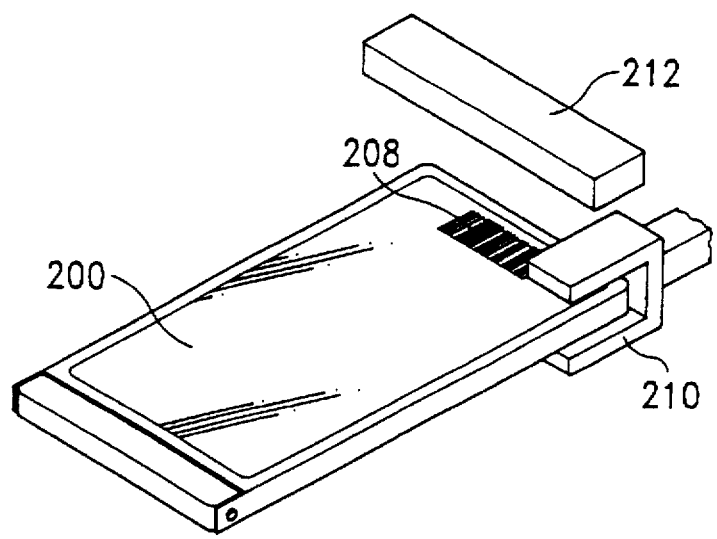
FIG. 2 is a schematic drawing illustrating the relationship among the document holder, a photodetector and an image sensor according to the present invention.

Turning to FIG. 2, in practicing the scanning system, the document 206 is put into the document holder 200. Then, the document holder 200 is fed into the cassette scanning system. The document holder 200 is fixed in the scanning system after the document holder 200 is fed into the scanning system. A sensor 210 is set in the cassette scanning system to detect whether the document holder 200 is in the scanning system or not. Further, an image sensor 212 is set in the scanning system to detect whether the document 206 is in the document holder 200 or not. Of course, the image sensor 212 is also used to capture the image of the document 206.

Figure 3:
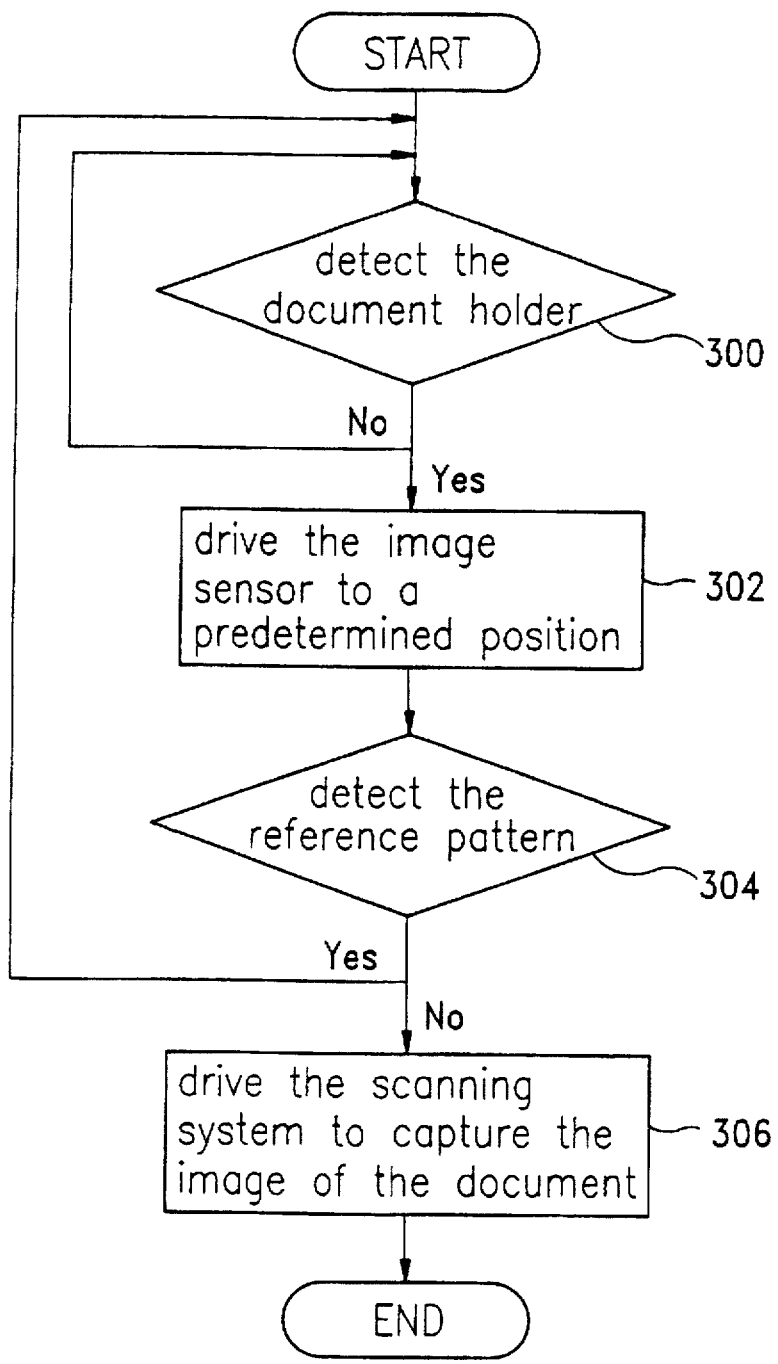
FIG. 3 is a flow chart illustrating a method according to one embodiment of the present invention.

FIG. 3 is a flow chart of a method to drive the scanning system according to one embodiment of the present invention. First, the cassette scanning system detects whether the document holder 200 is in the system or not by using the sensor 210 in the step 300. If the sensor 210 detects that the document holder 200 is in the scanning system. Subsequently, in the step 302, the scanning system is responsive to the sensor to drive the image sensor 212 to a predetermined position where is exactly over the reference pattern 208. In a preferred embodiment, a photodetector is utilized to serve the sensor 210.

Figure 4:
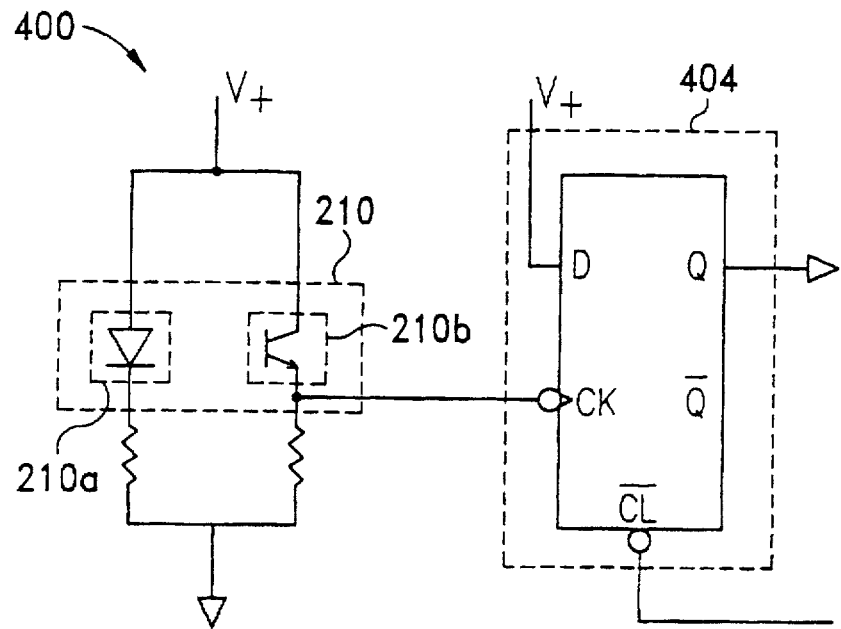
FIG. 4 is a circuit illustrating the photodetector and a D flip-flop according to the present invention.

As shown in FIG. 4, it illustrates a circuit 400 according to the present invention to recognize whether the document holder 200 is inside the scanning system or not. Preferably, the circuit 400 includes a photosensor 210 and a D flip-flop 404. As it is well known in the prior art, the photosensor 210 is connected to a high voltage denoted by V+. Typically, the photosensor 210 consists of a light-emitting diode (LED) 210a and a transistor 210b. The document holder 200 is set between the LED 210a and the transistor 210b when the document holder 200 is fed into the scanning system. If the document holder 200 is not inside the cassette scanning system, the transistor 210b can receive the light that is emitted from the LED 210a. Thus, the output of the photosensor 210 can be at high voltage depending on the type of the transistor 210b, for example, the transistor 210b is a phototransistor. The output signal is then fed to the clock (CK) terminal of the D flip-flop 404. The clock (CK) terminal is responsive to the signal to change the state from high voltage to low voltage. The D terminal of the D flip-flop 404 is typically connected to high voltage (V+). Therefore, the output of the Q terminal will not change the state. So that the image sensor 212 will not be driven. Conversely, while the document holder 200 is in the cassette scanning system, the transistor 210b can not receive the light that is emitted from the LED 210a. Hence, the output of the photosensor 210 is at the level of low voltage. Subsequently, the clock (CK) terminal of the D flip-flop 404 is responsive to the signal to change the state from low voltage to high voltage. The output of the Q terminal will change the state of output. The changed state will be fed into a control unit of the cassette scanning system to drive the image sensor 212.

Turning to FIG. 3, in step 302, the image sensor 212 is responsive to the changed state and be driven to the predetermined position as above described. Next, the cassette scanning system starts to detect whether the document 206 is in the document holder 200 or not by using an image sensor 212. If the image sensor 212 can detect to the signal that is reflected from the reference pattern 208. It means that the document 206 is not inside the document holder 200. The reference pattern 208 can be set on anywhere of the second cover 200a or the first cover 200b. It depends on the designer. In an embodiment, the reference pattern 208 is attached on the edge of the second cover 200b while the first cover 200a is made of transparent material. If the document 206 is in the document holder 200, then the reference pattern 208 is covered by the document 206. Thus, the image sensor 212 can not detect the reflected signal from the reference pattern 208. Therefore, in the step 306, the scanning system is responsive to the signal to drive the image sensor for capturing the image of the document 206. In this case, a contact image sensor (CIS) can be used to serve the image sensor 212. Alternatively, a charge couple device (CCD) can also be used to act the image sensor 212.

Figure 5:
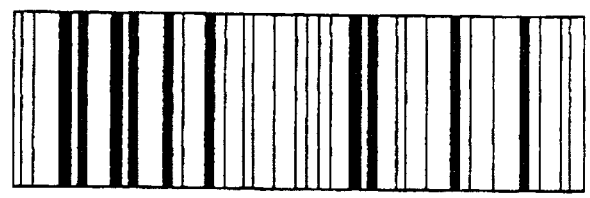
FIG. 5 is a schematic drawing of the reference pattern according to the present invention.

Turning to FIG. 5, it illustrates an example of the reference. The reference pattern 208 includes at least one black stripe depicted on a white ground or alternatively, at least one white stripe depicted on a black ground.

It is not necessary for the user to push any button for driving the scanning system. In the other word, the scanning system is automatically driven by using the present invention.

As is understood by a person skilled in the art, the foregoing preferred embodiment of the present invention is illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A method for driving a scanning system, said scanning system having a document holder with a reference pattern to hold a document, wherein said document holder having an opening for feeding said document into said document holder and said document holder can be fed into said scanning system, a first sensor being set in said scanning system to detect said document holder, a second sensor being set in said system for detecting said reference pattern, said reference pattern being formed and attached in said document holder for driving said scanning system, said method comprising the steps of:

feeding said document holder into said scanning system;

detecting the presence/absence of said document holder by using said first sensor, said second sensor being responsive to a first signal of said first sensor to move to a predetermined position where is exactly over said reference pattern; and detecting said reference pattern by using said second sensor, said second sensor being responsive to a reflected signal indicative the absence of said reference pattern to capture the image of said document.

2. The method of claim 1, wherein said scanning system further comprises a D flip-flop to respond said first sensor.

3. The method of claim 2, wherein said first sensor is a photosensor.

4. The method of claim 3, wherein said photosensor comprises a light emitting diode (LED) and a transistor.

5. The method of claim 1, wherein said second sensor a is contact image sensor (CIS).

6. The method of claim 1, wherein said second sensor is a charge couple device (CCD).

7. The method of claim 1, wherein said reference pattern includes at least one black stripe depicted on a white ground.

8. The method of claim 1, wherein said reference pattern includes at least one white stripe depicted on a black ground.

* * * * *